United States Patent [19]

Robinson et al.

[11] 4,085,812

[45] Apr. 25, 1978

[54] ACTUATOR SYSTEM FOR DUAL PATH TRANSMISSION

[75] Inventors: William J. Robinson; Harold G. Martin, both of Ames, Iowa

[73] Assignee: Sundstrand Corporation, Rockford, Ill.

[21] Appl. No.: 744,937

[22] Filed: Nov. 24, 1976

[51] Int. Cl.² .............................................. B62D 11/04
[52] U.S. Cl. .................................... 180/6.48; 60/486; 74/471 XY; 180/77 H
[58] Field of Search ............................ 180/6.48, 77 H; 74/471 XY; 60/484, 486, 490

[56] References Cited

U.S. PATENT DOCUMENTS

| Re. 27,488 | 9/1972 | Lauck | 180/6.48 X |
|---|---|---|---|
| 3,180,305 | 4/1965 | Gower-Rempel | 180/6.48 X |
| 3,885,388 | 5/1975 | Crull | 180/6.48 X |

Primary Examiner—Joseph F. Peters, Jr.
Assistant Examiner—John A. Pekar
Attorney, Agent, or Firm—Wegner, Stellman, McCord, Wiles & Wood

[57] ABSTRACT

An actuator system for a dual path transmission usable with a vehicle, such as a crawler tractor or the like, wherein a pair of hydrostatic transmission units each have at least one power unit with variable displacement means therefor responsive to a control pressure for setting displacement, a control console mountable on the vehicle has a plurality of control valves including a ratio valve for setting a control pressure to establish the direction and speed of travel of the vehicle by uniform speed of both transmission units, and steer valves which may modify the speed of at least one transmission unit for steering of the vehicle, and a control station including a manually operable control member remote from the control console with motion-transmitting linkages whereby movement of the control member in one path may cause adjustment of the ratio valve for establishing the speed and direction of travel of the vehicle either forward or reverse and with movement of the control lever along an intersecting path causing movement of one of the steer valves without effect on the ratio valve or the other steer valve for steering of the vehicle and with there being compound or universal movement capability for simultaneous control of both speed and steer functions.

23 Claims, 7 Drawing Figures

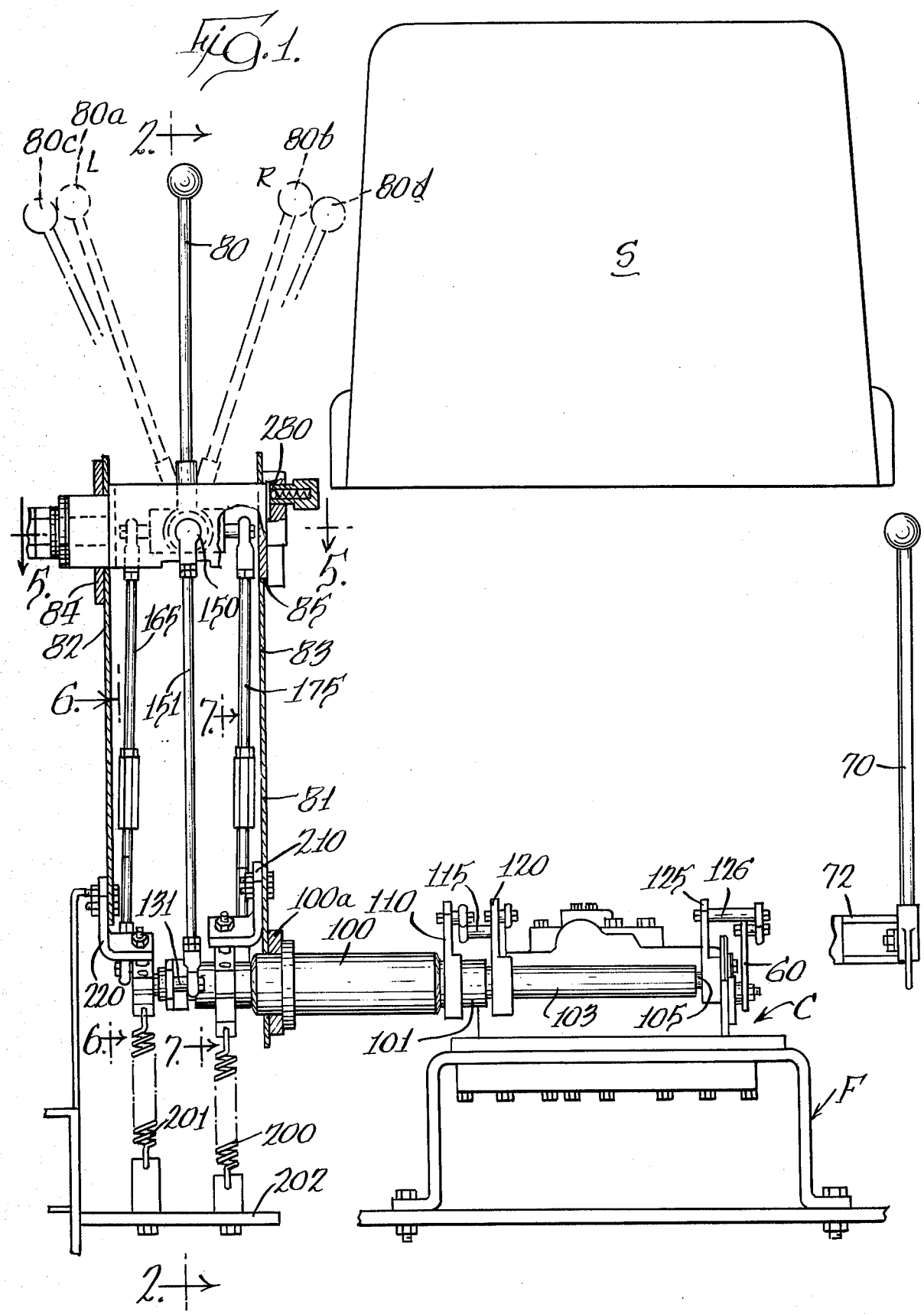

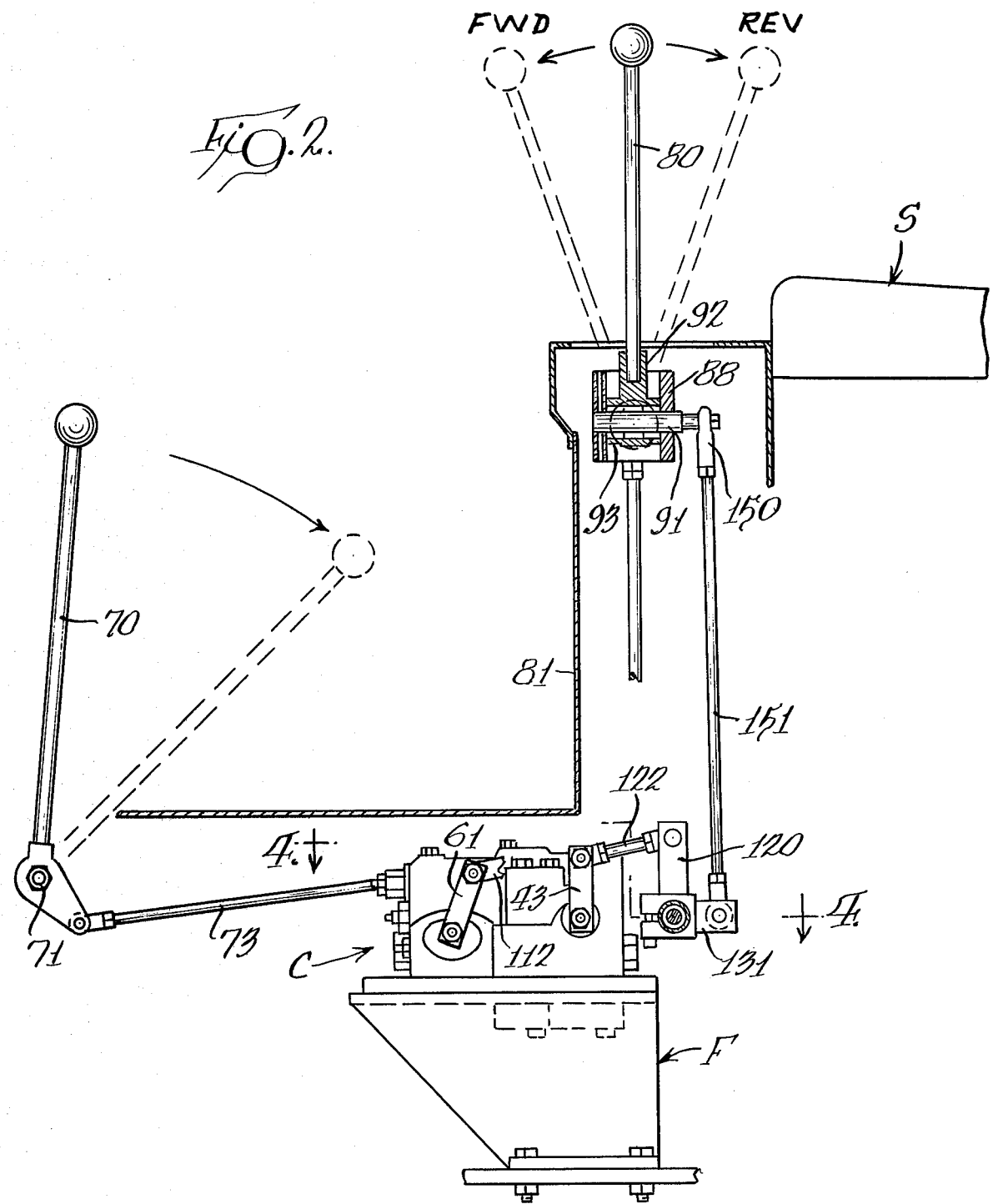

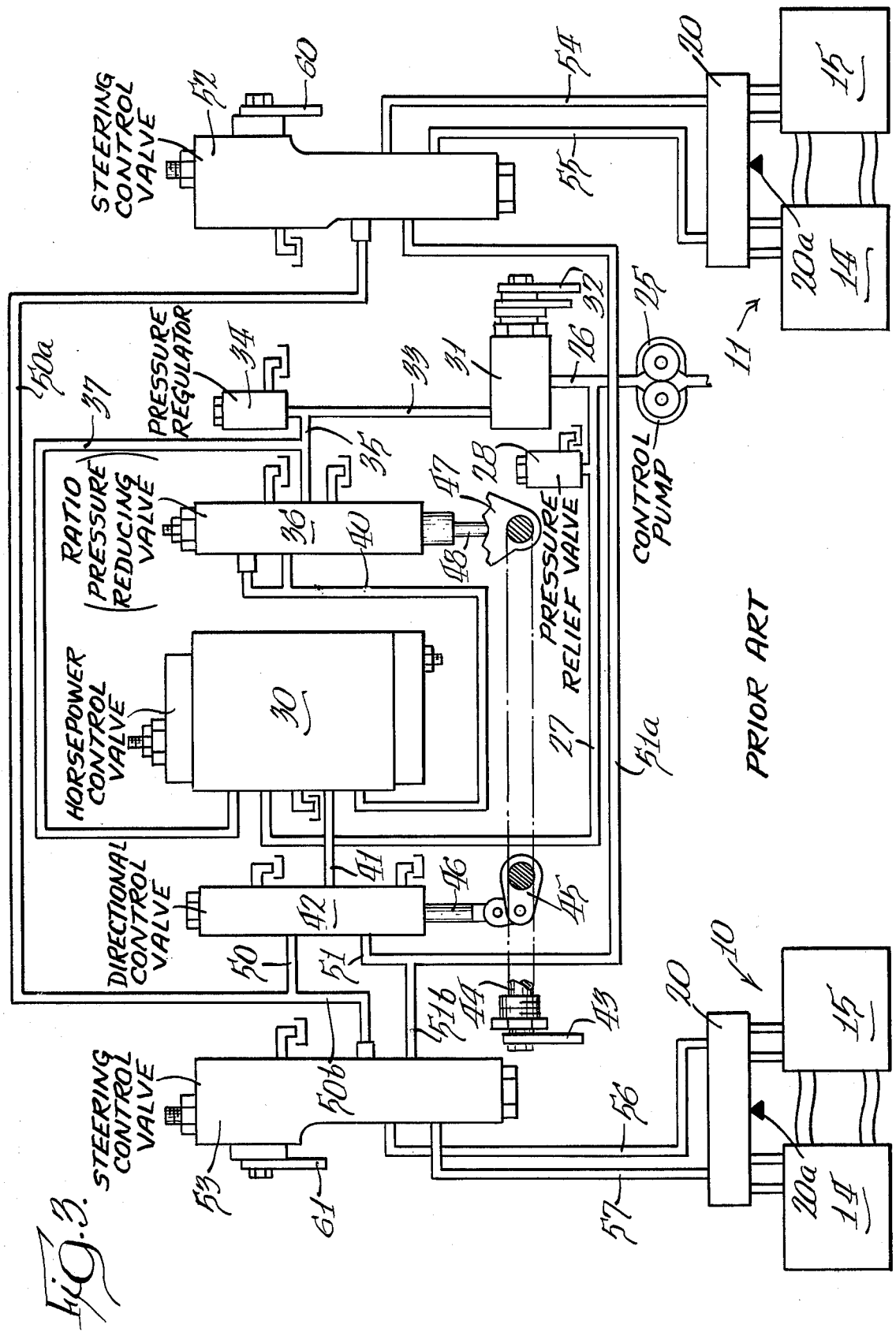

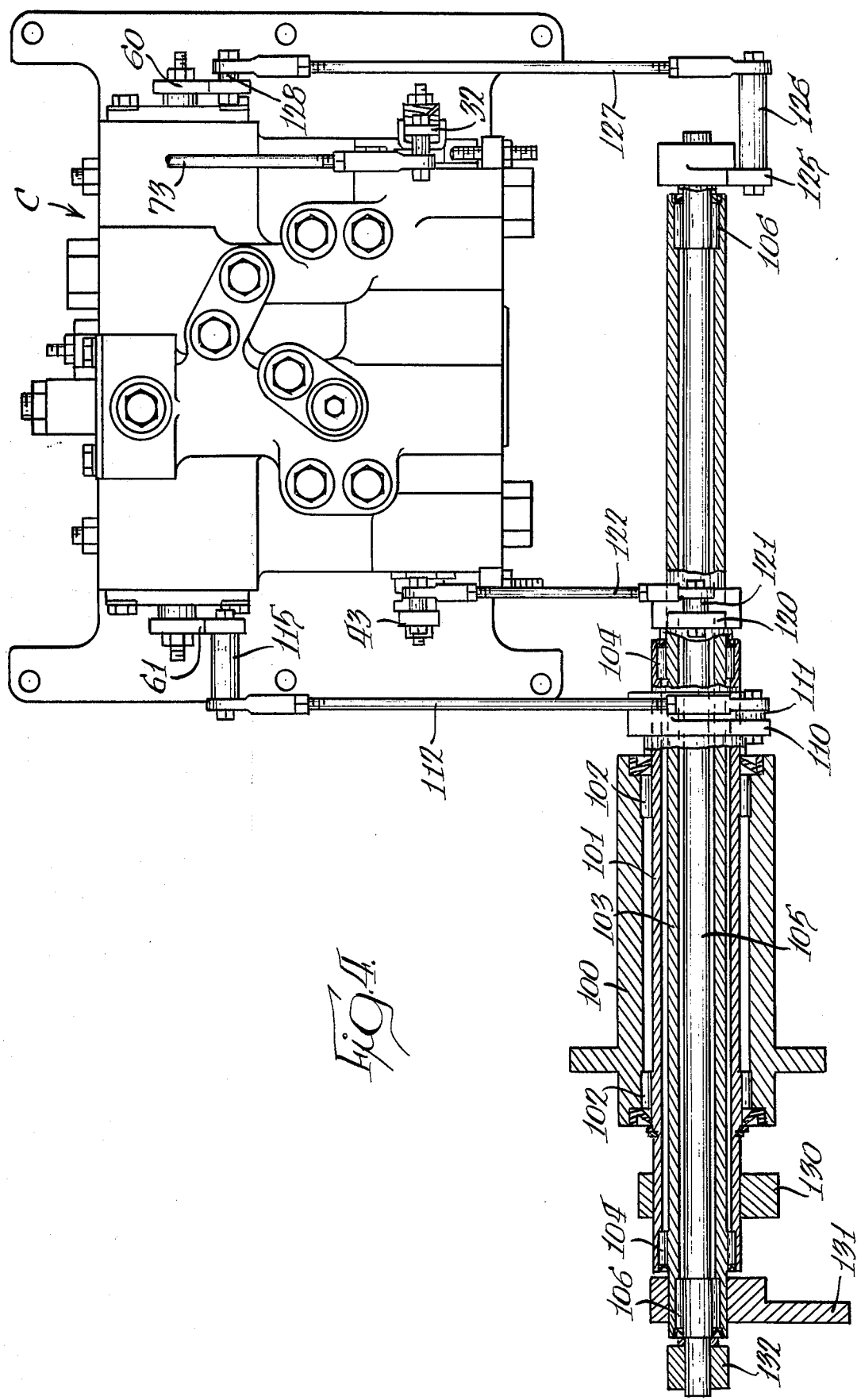

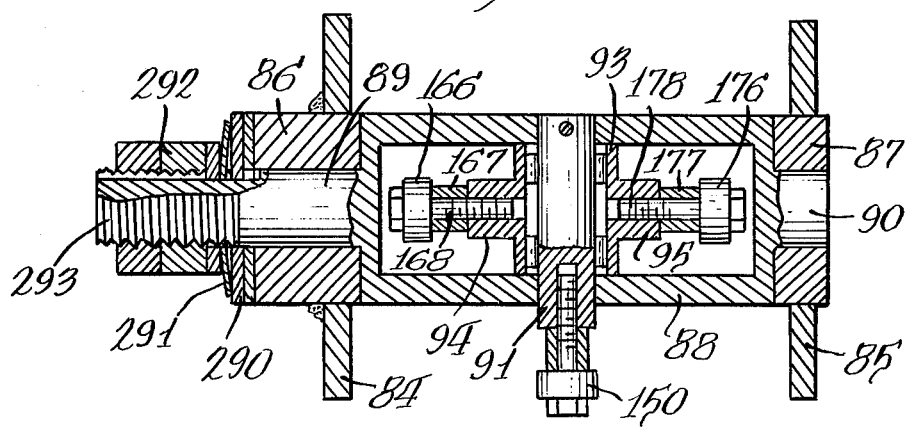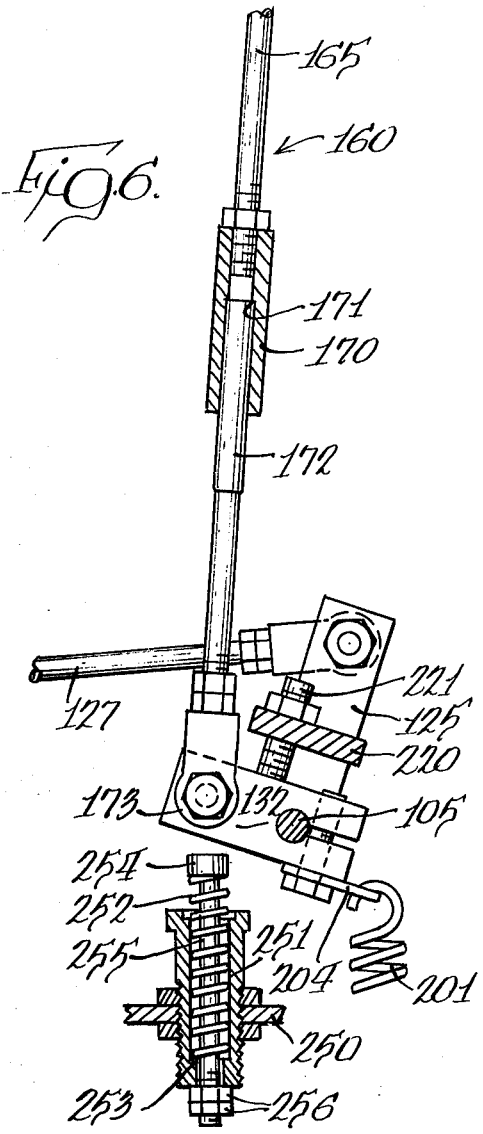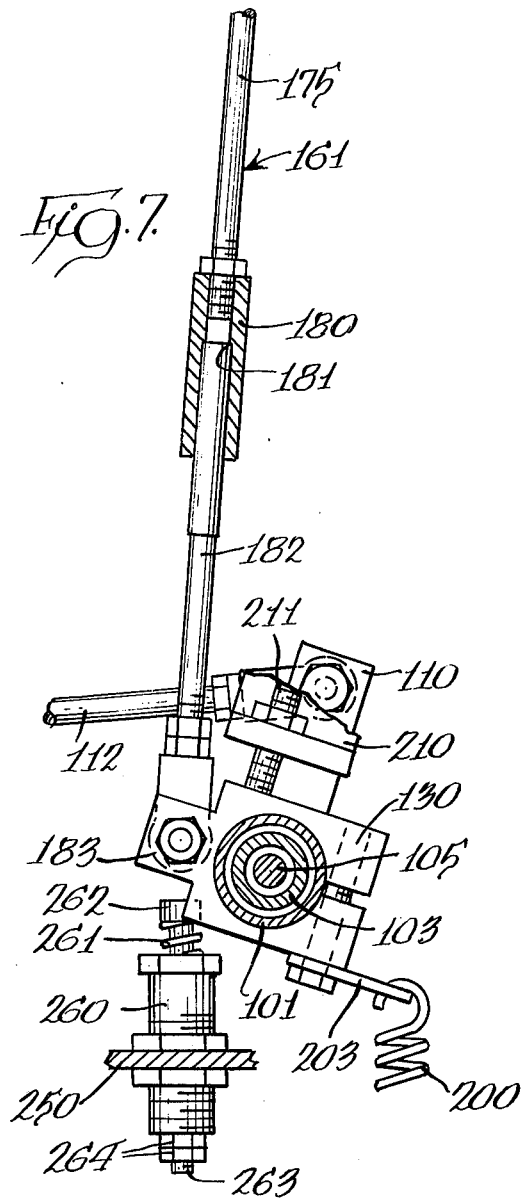

ACTUATOR SYSTEM FOR DUAL PATH TRANSMISSION

BACKGROUND OF THE INVENTION

This invention pertains to dual path transmission units and, more particularly, to operating structure of or control thereof.

Dual path transmissions have been known for many years and, particularly, hydrostatic transmissions wherein two pump-motor power units are interrelated to provide a hydrostatic transmission unit and with the control of displacement of one of the power units controlling the output speed of the transmission unit as well as the direction of the output. Many different systems have been disclosed for controlling the displacement of a transmission power unit in a dual path transmission, such as the various types of mechanical linkages shown in Bowers U.S. Pat. No. 2,941,609, with the mechanical linkages going directly to the displacement control structure. The Kempson U.S. Pat. No. 3,306,385 discloses three different lever members, with one lever setting a common speed for a pair of transmission units and two additional levers providing a steer function for the transmissions.

Neither of these patents disclose control systems wherein a speed-setting control pressure is delivered directly to the displacement controls for the transmission units.

The Lauck U.S. Pat. No. Re 27,488 discloses the delivery of a control pressure signal directly to the displacement control of a hydrostatic transmission unit with a pair of master speed-steer valves for two transmissions operable by linkage with uniform operation of both valves setting a speed and differential action of the valves accomplishing a steer function.

The Chatterjea U.S. Pat. No. 3,677,362 discloses a control system wherein a first valve sets a control pressure deliverable to the displacement controls of a pair of hydrostatic transmissions and with a pair of steer valves for modifying the control pressure for steer and with all of the valves being operable by a single control lever.

The Krusche U.S. Pat. No. 3,672,161 discloses a plurality of valves each of which apparently has a speed-steer function and with a universally movable lever positioned for operation of different groupings of such valves.

None of the foregoing patents disclose a system having a speed valve for setting a common control pressure for a pair of hydrostatic transmissions and a pair of steer valves with an actuator system having a control lever at a convenient location, remote from the valves and with a plurality of motion-transmitting linkages extended therebetween for imparting either independent or conjoint operation of the ratio valve and the steer valves.

SUMMARY

A primary feature of the invention disclosed herein is to provide an actuator system for a dual path transmission as used in a vehicle, such as a crawler tractor or the like, wherein hydraulic control valve components for establishing the displacement of elements of the transmissions may be operated from a distance by an actuator system including a control member having movements which may translate into movement only of a ratio valve for setting speed of the vehicle, movement solely of a steer valve for imparting a steer direction to the vehicle, or compound movements of both the speed valve and a steer valve and having a plurality of motion-transmitting linkages between the control member and said valves for selectively transmitting movement of the control member to selected ones of said valves.

Another feature of the invention is to provide an actuator system for a dual path hydrostatic transmission having a pair of transmission units for operation of a vehicle, such as a crawler tractor or the like, with each of the hydrostatic transmission units having a pair of power units with at least one being of variable displacement under the control of a pressure signal applied thereto, a control console is mountable on the vehicle, with a speed valve and a pair of steer valves for establishing pressure signals for application to the displacement controls for setting speed and direction of travel and steering of the vehicle, and a control station remote from the control console with a control lever movable to set the position of the speed valve and steer valves with a plurality of motion-transmitting linkages extended between the control lever and the control console and constructed whereby movement of the control lever in a speed controlling direction operates only the speed valve and operation of the control lever in a steer control direction operates only one of the steer valves dependent upon the direction of steering and with there also being the capability for conjoint movement of both a speed valve and a steer valve.

A further feature of the invention is to provide an actuator system, as defined in the preceding paragraph, wherein the motion-transmitting linkages include a plurality of rotatable coaxial shafts extending adjacent the control console and to a position underlying the control station, with there being three of said shafts each having an output arm connected by a link to an external operating member of one of said valves and each shaft having an input arm with one of said input arms connected to a rod to respond to movement of the control lever in a speed control direction and the other two input arms being operatively associated with a pair of rods connected to the control lever and with structure of said pair of rods enabling movement of only one of said pair of rods to effect movement of an input arm when the control lever moves in one steer direction and movement of only the other input arm when the control lever moves in an opposite steer direction.

Additionally, the control console has a fourth valve positionable dependent upon a throttle setting for a prime mover for supplying power to the transmission units and an additional lever and motion-transmitting linkage for said fourth valve.

Other features and advantages of the structure disclosed herein will be evident from the description and drawings contained herein and as set forth in the appended claims.

BRIEF DESCRIPTION OF THE DRAWINGS

FIG. 1 is a rear elevational view of the actuator system and associated structure shown assembled with components of a vehicle and with parts broken away;

FIG. 2 is a vertical section, taken generally along the line 2—2 in FIG. 1;

FIG. 3 is a schematic view of a pair of hydrostatic transmission units and the control system therefor as known in the prior art;

FIG. 4 is a plan section, taken generally along the line 4—4 in FIG. 2 and on an enlarged scale;

FIG. 5 is a plan section, taken generally along the line 5—5 in FIG. 1 and on an enlarged scale;

FIG. 6 is a vertical section, taken generally along the line 6—6 in FIG. 1 and on an enlarged scale and being a partial system view showing parts of a single motion-transmitting linkage;

FIG. 7 is a vertical section, on an enlarged scale taken generally along the line 7—7 in FIG. 1 and showing, in isolation, parts of another of the motion-transmitting linkages.

DESCRIPTION OF THE PREFERRED EMBODIMENT

For a complete understanding of the actuator system disclosed herein, reference may first be made to FIG. 3 which discloses a dual path hydrostatic transmission and a control system therefor. FIG. 3 to a schematic block diagram representing the structure shown in FIGS. 2A and 2B of Crull U.S. Pat. No. 3,885,388, issued May 27, 1975 and owned by the assignee of this application. The pair of transmission units are indicated generally at 10 and 11, and each have a pair of power units 14 and 15, each in the form of a pump-motor unit. Each of the power units 15 may be connected in a conventional known manner to respective drive sides of a vehicle, such as a crawler tractor or the like and each of the power units 14 is connected to a prime mover whereby in normal forward travel direction power input to the power unit 14 causes rotation thereof to hydraulically drive the power units 15 and the outputs connected thereto. One or the other of the power units 14 and 15 has a variable displacement capability and in the preferred embodiment both power units 14 and 15 are of variable displacement as disclosed in the Crull patent. Additionally, the power unit 14 has over-center displacement control for reverse direction of operation of the power unit 15. The control of the power units 14 and 15 is provided by a displacement control unit 20 and the structure thereof is disclosed in FIG. 2B of the Crull patent. The Crull patent disclosure is incorporated herein by reference.

In the control system for the displacement control 20, a control or charge pump 25 directs fluid under pressure to a line 26, with a branch line 27 having a pressure relief valve 28 therein directing a pressure $P_1$ to a horsepower control valve 30. A valve 31 having a variable orifice adjustable unit operable by an external operating member 32 is connected in line 26 and has an output line 33 with a pressure regulator valve 34 therein whereby a regulated pressure $P_R$ is delivered to a line 35 which extends to a ratio or speed valve 36 in the form of a pressure-reducing valve to set the ratio of the hydrostatic transmission units and, therefore, the output speed thereof. The pressure $P_R$ is also directed through a line 37 to constitute a pressure $P_2$ applied to the horsepower control or anti-stall valve 30 whereby the ratio of pressures $P_1$ and $P_2$ is monitored in the horsepower control valve 30 for sensing a potential stall condition of the prime mover which drives the power units 14 and also the control pump 25. This $P_1$ - $P_2$ relation is basically established by the setting of the variable orifice valve 31.

The ratio valve 36, by the setting thereof, delivers a control pressure $P_3$ to a line 40 extended to the horsepower control valve 30. When the latter valve is inactive, the control delivered thereto as $P_3$ is delivered thereto as $P_3$ is delivered at the same value as a control pressure $P_4$ to a line 41 and to a directional control valve 42.

The ratio valve 36 and the directional control valve 42 are controlled by an operating structure including an external operating member 43 which, by means of a shaft 44, is connected to an operator 45 connected to a stem 46 of the directional control valve 42 and to a multi-step cam 47 associated with a stem 48 of the ratio valve. Rotatable positioning of the external operating member 43 sets the position of the directional control valve to either a neutral position or a forward or reverse position and the setting of the cam 47 sets a position of the ratio valve 36 to establish the value of the control pressure $P_3$ which is delivered to the horsepower control valve 30.

A pair of lines 50 and 51 connect to the outlet side of the directional control valve 42, with the line 50 having a branch line 50a extending to a steer valve 52 and a branch line 50b extending to a steer valve 53. The lin 51 has a branch line 51b extending to the steer valve 53. Depending upon the position of the directional control valve, other than in neutral position, the control pressure $P_4$ delivered from the horsepower control valve 30 to the line 41 will be applied to one or the other of the lines 50 and 51 for delivery to both of the steer valves 52 and 53. Each of the steer valves 52 and 53 has a pair of control lines 54 and 55 and 56 and 57 extended to the associated displacement controls 20 for applying the pressure $P_4$ to the displacement control 20. Control pressure in either of the lines 56 or 57 determines whether in hydrostatic transmission will operate to provide forward or reverse travel for the vehicle. Each of the displacement controls 20 has a charge pump input 20a for delivery to the swashplate positioning means of the variable displacement mechanism dependent upon the position of the displacement controls 20.

Each of the steer valves 52 and 53 has an external operating member 60 and 61, respectively, whereby in one position thereof the steer valve is in a neutral position and merely lets the control pressure signal $P_4$ pass therethrough to one of the control lines 54–57. As the external operating member 60 or 61 is moved from the neutral position, there is a gradual connection of the control pressure line to tank to reduce the control pressure signal delivered to the displacement control 20 associated therewith. At a certain position of the valve member of a steer valve, there is a complete connection of the control pressure to tank and with further movement of the valve member reversing the connection of control lines 54–57 to the line extending from the directional control valve 42 that has the control pressure whereby the displacement of the hydrostatic transmission power units 14 is reversed to have the rotational output of the power units 15 opposite from the previous output direction.

In applying this control to a crawler tractor or the like, the prime mover speed is established with a corresponding setting of the variable orifice valve 31 and drive of the control pump 25 as well as the transmission power units 14. The direction of travel either forward or reverse of the vehicle as well as the speed thereof is established by operation of the external operating member 43 for positioning of the directional control valve 42 and the ratio valve 36. When it is desired to steer the vehicle to make either a right turn or a left turn, one of the external operating members 60 or 61 is operated to vary the basic control pressure delivered to one of the displacement units without affecting the control pressure delivered to the other, with a consequent reduction in the speed of the one transmission unit whereby there is a change in direction of the vehicle. A spin turn capability is obtained by a total movement of one steer valve member from its neutral position to its opposite limit position. In the event there is a stall condition on the prime mover, this is sensed by the horsepower control valve and causes control pressure $P_4$ to drop to a lower value than the pressure $P_3$ received by the last-mentioned valve to lower the control pressure delivered to both displacement controls for a reduction in output speed of the transmission units.

The foregoing is a general summary of the structure and operation disclosed in the Crull patent and reference may be made thereto for a more detailed disclosure and description of the foregoing operation, with the understanding that the Crull patent disclosure is incorporated herein.

The control system for establishing a control pressure and the value thereof that will be delivered to the displacement controls 20 for the pair of hydrostatic transmissions is built into a control console, indicated generally at C in FIGS. 1, 2 and 4, and the control console has a basic housing supported upon a frame structure, indicated generally at F, of the vehicle, such as a crawler tractor. The location of this console may be visualized by the showing of an operator's seat S in FIGS. 1 and 2, with the rear of said seat being viewed in FIG. 1, whereby the view is one looking in the direction of forward travel of the vehicle. Forward vehicle travel would be toward the left as viewed in FIG. 2.

The four external operating members 32, 43, 60 and 61 of the control system disclosed in FIG. 3 are identified in FIG. 4 in a plan view of the control console, with two of the members being at one side thereof and the other two at the other side of the control console.

A throttle lever 70, shown in FIGS. 1 and 2, is located forwardly and to the right of an operator in the seat S and is movable between the full line and broken line positions of FIG. 2 for controlling the throttle of the prime mover engine and also in rotating about a pivot 71 supported by a part 72 of the vehicle frame moves a link 73 connected to the external operating member 32 for the variable orifice valve 31.

The control of the external operating members for setting a speed and direction of travel of the vehicle by operation of the ratio (speed) valve 36 and the directional control valve 42 as well as operation of the steer valves 52 and 53 is from a control means having a control member in the form of a control lever 80 having movement between a neutral position, shown in full line in FIG. 2 and two broken line positions to either side thereof for establishing either forward or reverse travel of the vehicle and with these movements being along a path coincident with straight forward travel of the vehicle. For example, if the control lever 80 is moved counterclockwise, as viewed in FIG. 2, this is movement in the direction of forward travel of the vehicle and correspondingly causes the hydrostatic transmissions to operate in a direction to cause forward vehicle travel. The control lever 80 can also move along a path in directions as indicated from the neutral position, shown in full line in FIG. 1, to broken line positions to either side thereof. Broken line positions 80a and 80b represent the extent of movement of the control lever to either side of central position for either a full left turn or full right turn with the positions corresponding to actual direction of vehicle turning. When the control lever 80 is in the position 80a, the left transmission unit, as for example the one driving the left crawler track, will be at zero speed whereby the right crawler track is still operating at set speed and causing the vehicle to travel toward the left. The broken line positions 80c and 80d represent additional extents of movement of the control lever 80 in either direction, with the movement beyond the full turn position just described causing a counter rotate action and with the movement of the control lever to either of the positions 80c and 80d causing full reverse output of the associated transmission unit for a spin turn of the vehicle and less movement causing a pivot turn. With the mounting of the control lever as subsequently described, it should be noted that the different movements of the control lever 80 as described for clarity in connection with FIGS. 1 and 2 for steer and speed control individually may actually be a compound or universal movement whereby there is movement of the control lever in either direction from the full line position of FIG. 2 as well as movement in either direction from the full line position of FIG. 1 for conjoint control of both the ratio valve for setting a common control pressure applied to both hydrostatic transmissions as well as a modification thereof with respect to the control pressure delivered to one hydrostatic transmission whereby both vehicle speed and turning radius may be variably controlled. With the control system of FIG. 3 and the operating structure therefor including control lever 80, it is possible to have the same radius of vehicle turn for steering control at any ratio setting of the ratio valve 36.

The control lever 80 is mounted at a control station having a control pedestal 81 extending upwardly adjacent the left side and slightly forward of the operator's seat S. A pair of upstanding spaced-apart pedestal panels 82 and 83 mount a pair of plates 84 and 85 carrying journal members 86 and 87 which rotatably mount a control housing 88 rotatable about a first axis by having parts 89 and 90 extending from opposite ends thereof rotatably journalled in the journal members 86 and 87. Rotation of the control housing 88 about this axis causes corresponding movement of a control pin 91 which is connected to a first motion-transmitting linkage extending to the external operating member 43 for the ratio valve 36 and the directional control valve 42. The control lever 80 is mounted with an upper end 92 of a tubular member 93 rotatably mounted on the pin 91 by sealed bearings and the member 93 has a pair of lateral extensions 94 and 95 each of which are connected to a motion-transmitting linkage which extends to the external operating members 60 and 61 for the steer valves. The movement of the control lever 80 for forward and reverse and speed control of the vehicle is about the first axis while steer control with movement of the lever 80 to various positions generally illustrated in FIG. 1 is about a perpendicular intersecting axis and with the structure shown in FIGS. 2 and 5 permitting movement of the control lever about either axis without affecting movement of linkages operated by movement about the other axis.

Referring to the terminal end of the motion-transmitting linkages and, particularly, FIGS. 1 and 4, there are a series of rotatable coaxial shafts of different length extending to a location adjacent the control console C and each having an output arm with these output arms being at different locations for unimpeded operation of one with respect to the other. A housing 100 for the coaxial shaft system is connected to the control pedestal by structure shown at 100a in FIG. 1 and has a central passage mounting a first tubular shaft 101 of said series of coaxial shafts by bearings 102. A second tubular shaft 103 of said series of coaxial shafts is rotatably mounted within the tubular shaft 101 by means of bearings 104. A third shaft of said series of shafts is a solid shaft 105 rotatably mounted within the inner tubular shaft 103 by means of bearings 106.

The outermost tubular shaft 101 is for control of the external operating member 61 for the steer valve 53 and has an output arm 110 adjacent an end of the housing 100 which extends generally upward from the control shaft and has a swivel connection 111 to a link 112 which, through a swivel connection and a spacer 115 connects to the external operating member 61. The tubular coaxial shaft 103 extends outwardly beyond both ends of the outermost tubular shaft 101 and, at one end thereof, has an upwardly-extending output arm 120 which, by means of a swivel connection 121, connects to a link 122 extending forwardly to the control console for connection to the external operating member 43 for the ratio valve 36 and the directional control valve 42. The opposite end of the tubular shaft 103 extends beyond the outer tubular shaft 101 for input means to be described. The innermost shaft 105 extends outwardly beyond the end of the tubular shaft 103 which has a large extent thereof serving as a bearing mount extension for the shaft 105. The shaft 105 mounts an output arm 125 extending generally upwardly therefrom which, by means of spacer structure 126 is connected by a swivel joint to a forwardly-extending link 127 which, by a swivel joint 128, connects to the external operating member 60 for the steer valve 52. From the foregoing, it will be noted that operation of the ratio valve as well as the steer valves is solely dependent upon rotation of a particular one of the coaxial shafts and with the rotation of each one being independent of the others. The outputs from said shafts, in the form of the output arms 110, 120, and 125 are spaced-apart from each other whereby the connecting linkages to the external operating members of the valves may extend in noninterfering relation.

The motion inputs to the shafts are derived from a series of input arms which, as shown particularly in FIG. 4, include an input arm 130 fastened to the outermost tubular shaft 101 for one steer control input, an input arm 131 fastened to the tubular shaft 103 for inputting speed control motion and a third input arm 132 fastened to the inner shaft 105 for inputting steer control motion. These three input arms define parts of input means for motion input to the coaxial shafts with the remainder thereof being shown particularly in FIGS. 1, 2, 6 and 7. The portion of the motion-transmitting linkages for transmitting motion of the control lever 80 to the various ones of the input arms 130-132 is shown particularly in FIGS. 1, 2 and 5 to 7. The motion input to the input arm 131 for speed and forward or reverse direction control is derived from rotation of the pin 91 about the axis defined by the housing parts 89 and 90 by having an end of the pin extending beyond the control housing 88 and connected by a swivel connection 150 to a first rod 151 which extends downwardly, as shown in FIGS. 1 and 2, to connect by a swivel connection to the input arm 131. Movement of the control lever 80 in the forward travel direction, or to the left as viewed in FIG. 2, causes elevation of the rod 151 and corresponding elevation of the input arm 131 to move the connecting link 122 forwardly, or upwardly as shown in FIG. 4, for corresponding movement of the external operating member 43. Movement of the control lever 80 in the opposite direction causes resulting opposite direction of movement of the associated parts of the motion-transmitting linkage.

The lateral extensions 94 and 95 of the member 93 mounting the control lever 80 are each connected respectively to a pair of two-part control rods for steer control, indicated generally at 160 and 161, with the steer control rod 160 having a rod part 165 connected by a swivel joint 166 to the extension 94 by means of a spacer 167 and a threaded member 168. A sliding or loose coupling member 170 is secured to the lower end of the rod part 165 and has a bore with a shoulder 171 to abut against the upper end of a lower rod part 172 which, at its lower end, is connected by a swivel connection 173 to the input arm 132.

The steer control rod 161 has an upper rod part 175 connected to the member extension 95 by a swivel joint 176, a spacer 177, and a threaded member 178. The lower end of the rod part 175 has a loose or slidable coupling tube 180 secured thereto with an internal bore having a shoulder 181 to loosely receive the upper end of a lower rod part 182 which is connected at its lower end by a swivel joint 183 to the input arm 130. In the control system disclosed herein, it is preferable to operate one of the steer valves 52 or 53 without operation of the other and it will be noted that rotation of the member 93 about an axis defined by the pin 91 will cause movement of both of the upper rod parts 165 and 175 and it is the purpose of the slidable couplings 170 and 180 to cause resulting movement of one steer control valve without the other. It will be noted that steer control rotation about the axis defined by pin 91 does not have any effect on the speed control rod 151 because of the intersecting relation of the two axes of movement of the control lever 80.

This independent operation of the steer control valves is obtained by the couplings 170 and 180 referred to above and also by the particular structure associated with the input arms 130 and 132. Each of these arms are urged to an inactive position against adjustable stops by springs 200 and 201, respectively, which extend between fastening members carried by a pedestal plate 202 and attaching members 203 and 204 secured to the respective input arms 130 and 132. An adjustable stop for the input arm 130 includes an L-shaped member 210 having one leg thereof fastened to the pedestal plate 81 and having the other leg thereof carrying an adjustable threaded member 211 having an end engageable with the upper surface of the input arm 130. The adjustable stop for the input arm 132 includes an L-shaped bracket 220 having one leg thereof fastened to the pedestal plate 82 and the other leg carrying an adjustable threaded member 221 having an end positionable for engagement with the upper surface of the input arm 132. Assuming the control lever 80 is moved in a direction to lower the control rod 160, the lower rod part 172 will move with the upper rod part 165 and move the input arm 132 away from the adjustable stop structure. At the same time, the control rod 161 has the upper rod part 175 moving upwardly. However, the lower rod part 182 will remain stationary because of the loose coupling 180 and the input arm 130 being held against the adjustable stop element 211. Movement of the control lever in an opposite direction about the steer control axis results in movement of the input arm 130 without movement of the input arm 132, with the latter input arm remaining in engagement against the stop member 221. In addition to holding the input arms against the adjustable stop structure, the springs 200 and 201 function to provide resistance against movement of the control lever 80 in a steer function. When the steer control lever 80 is moved into a counter range of movement, namely, between positions 80a and 80c and positions 80b and 80d, additional resistance is imparted to movement of the control lever by means of preloaded spring structures, shown in FIGS. 6 and 7. Referring first to the steer control structure shown in FIG. 6, a plate 250 attached to the pedestal mounts a sleeve member 251 housing a spring 252 which bottoms against a surface 253 of the housing and engages under a flange 254 of a movable stem 255 disposed within the spring and having a lower end extended outwardly of the housing 251 and having nuts 256 threaded thereon. The position of the nuts 256 may be varied to control the preloading of the spring 252 and these nuts also engage against the underside of the housing 251 to limit the upward movement of the stem 255. As shown in FIG. 6, flange 254 is positioned at a distance beneath the swivel joint 173 for the steer control rod 160. When the control lever 80 is moved to position 80a, the swivel joint will come into engagement with the flange 254 and further movement of the control lever toward the position 80c will be resisted by downward movement of the stem 255.

A similar structure is shown in FIG. 7, with a housing 260 carried by the plate 250 and having a spring 261 therein engaging a flange 262 on a stem 263 to urge the stem upwardly and with the upward movement being limited by the adjustable nuts 264 which also control the preloading of the spring. When the control lever 80 has moved to position 80b, the swivel joint 183 will be moved into engagement with the flange 262 with further movement of the control lever 80 towards position 80d causing movement of the stem against the action of the spring 261.

The control lever 80 has a detented neutral position with respect to speed and direction control provided by a spring-urged detent 280 (FIG. 1) on the pedestal engageable with a notch in the control housing 88 when the housing is in a neutral position. Preferably, the control lever 80 may be maintained in any position between the broken line extreme speed and direction control positions, shown in FIG. 2, by means of friction discs 290 acting between and carried by the journal member 86 and the lateral extension 89 of the control housing, respectively. The engagement force therebetween is established by a disc spring 291 and the compression may be varied by adjustable threaded members 292 carried on a threaded end 293 of the lateral extension 89.

It should be noted that, with the linkage connections as disclosed, the steer valve 52 is operated when the vehicle is to be steered to the left, even though this particular valve is located at the right-hand side of the control console, as viewed in FIG. 4. The actual physical location of the steer valves 52 and 53 in the control console need not be related to the direction of steer, since the steer control valves may have their control lines 54-57 connected in any desired manner to the two transmission units.

In operation, an operator seated at seat S may operate the throttle control rod 70 to set a desired engine speed and, at the same time, set the variable orifice valve 31. The control lever 80 may then be moved to a full forward position to set the speed ratio valve 36 for full forward speed of the vehicle or moved a lesser distance for a slower speed. If the operator wishes to steer either to the right or left while the control lever is full forward, a slight movement is imparted to the control lever toward either of the positions 80a or 80b, shown in FIG. 1, without this movement effecting the motion-transmitting linkage to the speed ratio valve 36. Because of the particular structure of the control lever and motion-transmitting linkage systems, there will be a slight movement of the end of the control lever 80 back from the full forward position, as the control lever is moved in a steer control direction. Similarly, the same type of action occurs when the control lever 80 is moved to a full reverse direction and speed of travel and if a steer control signal is inputted by movement of the control lever. With the structure and control system disclosed herein, it is possible to have the same radius of turn for steering of the vehicle at any setting of the ratio valve 36. If the control lever 80 is full forward and a steer control motion is imparted thereto, there will be a certain radius of turn established and if the control lever 80 is moved backwardly, to reduce the forward speed position thereof and of the ratio valve 36, there will be a reduction in ground speed of the vehicle. However, the turning radius of the vehicle will remain the same. The inputting of a steer command may be at any speed in either direction of vehicle travel.

With the actuator system disclosed herein, the movements of the control lever 80 are adapted to normal arm and wrist movements of an operator and with the actuator system controlling a dual path hydrostatic transmission of the type disclosed in the aforesaid Crull patent, it will be recognized that there is full capability for forward and reverse travel of the vehicle at varying speeds and with steer capability while travelling either forward or reverse and with spin or pivot turn capability. The basic speed and directional positioning of the control lever may be maintained, without manual control while the steer control function must be maintained by the operator and if the operator releases the control lever during a steer the control lever will return to a steer neutral position because of the urging of the springs 200 and 201 which bring the steer valves 52 and 53 back to a neutral or inactive position.

We claim:

1. A single lever actuator system for the control of a vehicle dual path transmission having a pair of independent transmission units with a first means for establishing a uniform speed and travel direction for both units and second and third means associated one with each transmission unit for modifying the speed of one unit independent of said first means for steer control comprising, a control lever, means for mounting said control lever for movement about two angularly related axes with movement of said control lever about one axis for controlling said first means for speed control and at the same time swinging the other axis about said one axis and movement of said control lever about the other axis for controlling said second and third means for steer control and at the same time swinging said one axis about said other axis, first, second and third motion-transmitting linkages operatively associated with each of said first, second and third means, respectively, and each with a part operatively connected to said control lever, said first linkage having a first part connected to said control lever along said other axis, said second and third linkages having second and third parts, respectively, connected to said control lever on either side of said other axis along said one axis, said second and third parts both being moved in a steer control operation, and means for rendering movement of said part of one of said second and third linkages ineffective to operate its associated speed-modifying means.

2. A single lever actuator system for the control of a vehicle dual path transmission having a pair of independent transmission units with a first means for establishing a uniform speed and travel direction for both units and second and third means associated one with each transmission unit independent of said first means for steer control, each of said pair of transmission units including a pair of hydrostatic power units with at least one having variable displacement means responsive to a hydraulic control pressure, said first means including a speed valve for setting a speed control pressure for both transmission units, and said second and third means each including a steer valve positioned in series between the speed valve and the associated transmission unit, said system comprising, a control lever mounted for movement about two angularly related axes with movement about one axis for control of speed by control of said first means and movement about the other axis for steer control of the second and third means, three separate motion-transmitting linkages operatively associated with each of said first, second and third means and each with a part operatively connected to said control lever, said parts of the two motion-transmitting linkages associated with the second and third means both being moved in a steer control operation, and means for rendering movement of said part of one of the last-mentioned motion-transmitting linkages ineffective to operate the associated speed-modifying means.

3. A system as defined in claim 2 wherein each of said valves has a movable valve member, and said motion-transmitting linkages each having a connection to respective ones of said valve members.

4. A system as defined in claim 2 including a fourth valve positionable dependent upon a throttle setting and an independent lever and motion-transmitting linkage for said fourth valve.

5. A system as defined in claim 2 wherein said speed valve and steer valves are in a control console, and said motion-transmitting linkages including a series of rotatable coaxial shafts for transmitting movement of the control lever to one or more of said speed and steer valves.

6. A system as defined in claim 5 wherein said means for rendering said part of one of said motion-transmitting linkages ineffective for steer control include a two-part rod operatively connected to the control lever with each rod having a coupling to have a first rod part move a second rod part in one direction of movement of the control lever about said other axis but not move the second rod part when the control lever moves in an opposite direction about said other axis, and input means associated with two of said rotatable coaxial shafts operable one by each of said rod second parts when the latter are moved by said rod first part, an adjustable stop for each input means establishing a neutral position, and means yieldably urging each input means adjacent said adjustable stop and acting in opposition to movement of a rod second part.

7. A system as defined in claim 6 having a third rotatable coaxial shaft with input means connected to said control lever for rotation of said third shaft when the control lever moves about said one axis, and said three coaxial shafts extending to the location of the control console and having three spaced-apart output arms associated one with each coaxial shaft, each of said speed valve and steer valves having a movable valve member with an external operating member, and links interconnecting said output arms and external operating members.

8. A system as defined in claim 2 wherein each of said steer valves may be moved beyond a certain position to reverse the output direction of the associated transmission unit, and means for increasing the resistance to movement of the control lever when a steer valve is moved beyond said certain position.

9. A system as defined in claim 8 wherein said resistance-increasing means includes at least one spring member operable in response to control lever movement.

10. A system as defined in claim 8 wherein said resistance-increasing means includes a pair of spring-loaded members positioned for engagement by a part of the steer control motion-transmitting linkages when one of said last-mentioned linkages has moved a distance to move the associated steer control valve means to said certain position.

11. An actuator system for the control of a vehicle dual path transmission having a pair of independent transmission units with a first means for establishing a uniform speed and travel direction for both units and second and third means associated one with each transmission unit for modifying the speed of one unit independent of said first means for steer control, each of said pair of transmission units including a pair of hydrostatic power units with at least one having variable displacement means responsive to a hydraulic control pressure, said first means including a ratio valve for setting a control pressure for both transmission units, and said second and third means each including a steer valve changing the displacement of a power unit from the displacement established by the ratio valve, said system comprising, a control member movable for control of speed by control of said first means for steer control of the second and third means, and operating means including a plurality of motion-transmitting linkages operatively associated with said first, second and third means and each operatively connected to said control member for moving said speed control linkage independent of the steer control linkage.

12. A system as defined in claim 11 wherein said motion-transmitting linkages include a series of rotatable coaxial shafts for transmitting movement of the control member to one or more of said speed and steer valves.

13. A system as defined in claim 12 wherein there are a pair of motion-transmitting linkages for steer control and each have a two-part rod operatively connected to the control member with each rod having a coupling to have a first rod part move a second rod part in one direction of movement of the control member for steer control but not move the second rod part when the control member moves in an opposite direction for steer control, and input means associated with two of said rotatable coaxial shafts operable one by each of said rod second parts when the latter are moved by said rod first part, an adjustable stop for each input means establishing a neutral position, and means yieldably urging each input means against said adjustable stop and acting in opposition to movement of a rod second part.

14. A system as defined in claim 13 wherein the ratio valve and steer valves are at a common location, a third rotatable coaxial shaft with input means connected to said control member for rotation of said third shaft when the control member moves for speed control, and said three coaxial shafts extending to said common location and having three spaced-apart output arms associated one with each coaxial shaft, each of said ratio valve and steer valves having a movable valve member with an external operating member, and links interconnecting said output arms and external operating members.

15. A single lever actuator system for the control of a vehicle dual path transmission having a pair of independent transmission units with a first means for establishing a uniform speed and travel direction for both units and second and third means associated one with each transmission unit for modifying the speed of one unit independent of said first means for steer control comprising, a control lever, means for mounting said control lever for movement about two different axes including a speed control axis and a steer control axis with movement of said control lever about said speed control axis swinging said steer control axis about said speed control axis for controlling said first means for speed control and with movement of said control lever about said steer control axis swinging said speed control axis about said steer control axis for controlling said second and third means for steer control, and means including motion-transmitting linkages operatively associated with said first, second and third means and with said control lever for transmitting movement of the control lever about said speed control axis to said first means only and for transmitting movement of the control lever about said steer control axis to only one or the other of said second and third means dependent upon the direction of rotation of the control lever about said steer control axis.

16. A system for speed and steer control for a crawler tractor or the like having a dual path transmission including a pair of independent hydrostatic transmission units including at least one power unit having variable displacement means settable in response to a control pressure, a control console mountable upon the vehicle and having a ratio valve for setting a control pressure common to both of the hydrostatic transmission units for establishing a uniform speed and travel direction for both transmission units and the vehicle, a pair of steer valves mounted in the control console for each modifying the speed of one transmission unit to establish a non-uniform speed therebetween whereby the vehicle may be steered, a control station remote from said control console and including a manually operable control member for establishing the direction and speed of movement of the vehicle, and a plurality of motion-transmitting linkages extending between the control station and the control console including a first motion-transmitting linkage associated with the control member and the ratio valve for setting a uniform speed and travel direction for both of the hydrostatic transmission units and additional motion-transmitting linkages associated with the control member and the steer valves operable independently of said first motion-transmitting linkage for control of at least one steer valve to modify the speed of at least one hydrostatic transmission unit for steering the vehicle.

17. A system as defined in claim 16 including a fourth valve positionable dependent upon a throttle setting and an independent lever and motion-transmitting linkage for said fourth valve.

18. A system as defined in claim 16 wherein said control member is a control lever, and means mounting said control lever for universal movement about two perpendicular intersecting axes.

19. A system as defined in claim 18 wherein each of said steer valves may be moved beyond a certain position to reverse the output direction of the associated transmission unit, and means for increasing the resistance to movement of the control lever when a steer valve is moved beyond said certain position.

20. A system as defined in claim 16 wherein said motion-transmitting linkages include a series of rotatable coaxial shafts for transmitting movement of the control member to one or more of said speed and steer valves.

21. A single lever actuator system for speed and steer control of a vehicle such as a crawler tractor or the like having a pair of independent hydrostatic transmission units including at least one variable displacement power unit having a displacement control responsive to a hydraulic control pressure, a control console having a ratio valve and a pair of steer valves mountable on the vehicle and in hydraulic communication with said variable displacement means for the hydrostatic power units, a control station at a location remote from the control console and having a manually operable control lever movable about one axis for setting a uniform speed as well as forward or reverse travel direction for the transmission units and movable about another axis for establishing a turn for the vehicle, three separate motion-transmitting linkages each having a part operatively connected to the control lever and associated one with each of the ratio valve and the pair of steer valves, said motion-transmitting linkages including a series of coaxial rotatable shafts of different lengths extending adjacent the control console and with each shaft having an output arm with there being two shafts and output arms connected one to each of the steer valves and a third shaft and output arm connected to the ratio valve, each of said rotatable coaxial shafts extending to different positions underlying the control station and having an input arm whereby motion applied to an input arm results in rotation of an associated output arm by rotation of the interconnecting rotatable coaxial shaft, a first rod extended between the control lever and an input arm which operates the ratio valve whereby movement of the control lever about said one axis results in movement of the ratio valve to establish a control pressure and a direction of travel for the vehicle, the motion-transmitting linkages for the steer control valves each having a rod extended between the control lever and an associated input arm of said rotatable coaxial shafts; said input arms for the steer control valves being urged by yieldable urging means to a null position against an adjustable stop and with movement of the control lever in one direction about said other axis causing the associated rod to move the associated input arm away from its adjustable stop and against the force of said yieldable urging means; each of the rods of the motion-transmitting linkages for the steer control valves being of a two-part construction with a loose coupling therebetween and having a first part connected to the control lever whereby only one of the rods is operative in one direction of movement of the control lever about the other axis to urge an input arm away from its adjustable stop while the other rod has its first part moving without affecting its associated input arm because of the loose coupling, said control lever in moving about said other axis having a first range of movement in one direction to move a steer valve an amount sufficient to reduce the speed of an associated transmission unit to zero and having a further range of movement for operation of a steer valve to cause the associated transmission unit to operate in the opposite direction and means associated with the rods of the motion-transmitting linkages for the steer valves to impart additional resistance to manual movement of the control lever when said control lever moves into said further range of movement.

22. An actuator system for the control of a vehicle dual path transmission having a pair of independent transmission units with a first means for establishing a uniform speed and travel direction for both units and second and third means associated with each transmission unit for modifying the speed of one unit independent of said first means for steer control, comprising a control member including a control housing mounted to the vehicle for rotation about a first axis and a control lever mounted to said control housing for rotation about a second axis intersecting and perpendicular to said first axis, said control lever rotating about said first axis when said control housing is rotated about said first axis and motion-transmitting linkages connected to said control member at said rotational axes including a first linkage connected to said control member for transmitting movement of the control lever about one of said axes to said first means, second and third linkages connected one on each side of said control member for transmitting movement of the control lever about the other axis to said second and third means respectively, and means for rendering movement of said second and third linkages ineffective to simultaneously transmit movement to said second and third means, whereby movement of said control lever about one axis only moves linkages connected to said control member along the other axis.

23. An actuator system as defined in claim 22 wherein said operating means includes two motion-transmitting linkages associated one with each of said second and third means with means providing for movement of one of the second and third means without movement of the other.

* * * * *